US009135238B2

(12) United States Patent
Bunescu et al.

(10) Patent No.: US 9,135,238 B2
(45) Date of Patent: Sep. 15, 2015

(54) DISAMBIGUATION OF NAMED ENTITIES

(75) Inventors: Razvan Constantin Bunescu, Austin, TX (US); Alexandru Marius Pasca, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 459 days.

(21) Appl. No.: 11/427,678

(22) Filed: Jun. 29, 2006

(65) Prior Publication Data

US 2007/0233656 A1 Oct. 4, 2007

Related U.S. Application Data

(60) Provisional application No. 60/744,091, filed on Mar. 31, 2006.

(51) Int. Cl.
*G06F 17/30* (2006.01)
*G06F 17/27* (2006.01)

(52) U.S. Cl.
CPC .................................. *G06F 17/278* (2013.01)

(58) Field of Classification Search
CPC .................................................. G06F 17/278
USPC ...................................................... 707/3, 759
See application file for complete search history.

(56) References Cited

U.S. PATENT DOCUMENTS

| | | | | |
|---|---|---|---|---|
| 6,006,221 | A * | 12/1999 | Liddy et al. | 1/1 |
| 6,167,368 | A * | 12/2000 | Wacholder | 704/9 |
| 6,263,335 | B1 * | 7/2001 | Paik et al. | 1/1 |
| 7,024,407 | B2 * | 4/2006 | Bradford | 707/5 |
| 7,086,002 | B2 * | 8/2006 | Elo et al. | 715/234 |
| 8,521,526 | B1 * | 8/2013 | Lloyd et al. | 704/236 |
| 2002/0026456 | A1 * | 2/2002 | Bradford | 707/500 |
| 2002/0073115 | A1 | 6/2002 | Davis | |
| 2004/0205457 | A1 * | 10/2004 | Bent et al. | 715/500 |
| 2004/0236725 | A1 * | 11/2004 | Amitay et al. | 707/3 |
| 2005/0015366 | A1 * | 1/2005 | Carrasco et al. | 707/3 |
| 2005/0071741 | A1 * | 3/2005 | Acharya et al. | 715/500 |
| 2005/0080780 | A1 * | 4/2005 | Colledge et al. | 707/4 |
| 2005/0149494 | A1 | 7/2005 | Lindh et al. | |
| 2006/0224565 | A1 * | 10/2006 | Ashutosh et al. | 707/3 |
| 2007/0060109 | A1 * | 3/2007 | Ramer et al. | 455/414.1 |
| 2007/0067285 | A1 * | 3/2007 | Blume et al. | 707/5 |
| 2007/0078822 | A1 * | 4/2007 | Cucerzan et al. | 707/3 |
| 2008/0065621 | A1 * | 3/2008 | Ellis | 707/5 |
| 2008/0195601 | A1 * | 8/2008 | Ntoulas et al. | 707/5 |
| 2009/0222444 | A1 * | 9/2009 | Chowdhury et al. | 707/5 |

FOREIGN PATENT DOCUMENTS

WO 2005/116866 12/2005

OTHER PUBLICATIONS

Article entitled "Information Retrieval Based on Context Distance and Morphology", dated 1999, by Jing et al.*

(Continued)

*Primary Examiner* — Mahesh Dwivedi
(74) *Attorney, Agent, or Firm* — Fish & Richardson P.C.

(57) ABSTRACT

Named entities are disambiguated in search queries and other contexts using a disambiguation scoring model. The scoring model is developed using a knowledge base of articles, including articles about named entities. Various aspects of the knowledge base, including article titles, redirect pages, disambiguation pages, hyperlinks, and categories, are used to develop the scoring model.

14 Claims, 4 Drawing Sheets

(56) References Cited

OTHER PUBLICATIONS

Article entitled "Named Entity: History and Future" by Sekine dated 2004.*
Article entitled "Unsupervised Name Disambiguation via Social Network Similarity" by Malin dated 2005.*
Article entitled "Word Sense Disambiguation Based on Term to Term Similarity in a Context Space" by Artiles et al. dated Jul. 2004.*
Article entitled "Fine-Grained Word Sense Disambiguation Based on Parallel Corpra, Word Alignment, Word Clustering, and Aligned Wordnets" by Tufis et al. dated 2004.*
Wikipedia Entry for Wikipedia:Redirect, Mar. 2, 2005, by Redirect.*
Wikipedia Entries for Redirect articles on "Tricky Dick" and "Dick Nixon", collectively dated Nov. 3, 2004, by Wikipedia.*
Disambiguation Page for John Edwards, dated Feb. 12, 2005, by Wikipedia.*
Wikipedia Page for John Edwards, dated Feb. 14, 2005.*
Thorsten Joachims, *Optimizing Search Engines using Clickthrough Data*, Proceedings of the Eighth ACM SIGKDD International Conference on Knowledge Discovery and Data Mining, Jul. 23-26, 2002, pp. 133-142.
PCT Notification of Transmittal of International Search Report and Written Opinion for corresponding International Application No. PCT/US 07/65800, dated Apr. 2, 2007.
Shiren Ye et al., "Querying and Clustering Web Pages about Persons and Organizations", Proceedings of the IEEE/WIC International Conference on Web Intelligence (2003), 7 pages.
Nina Wacholder et al. "Disambiguation of Proper Names in Text", Preprint of paper to be published in the Proceedings of the $5^{th}$ Applied Natural Language Processing Conference, Mar. 31 to Apr. 3, 1997, Washington, D.C., 7 pages.
PCT Notification Concerning Transmittal of International Preliminary Report on Patentability dated May 8, 2008 with the PCT Written Opinion of the International Searching Authority, International Application No. PCT/US/05/45189, dated Sep. 18, 2007.
Office Action issued in Chinese Application No. 200780019877.3 on Dec. 4, 2009, 7 pages (English only).
Office Action issued in Chinese Application No. 201110078748.X on Apr. 19, 2012, 13 pages (English only).
Office Action issued in Chinese Application No. 201110078748.X on Mar. 27, 2013, 14 pages (with English translation).
Office Action issued in Canadian Application No. 2,647,738 on Apr. 11, 2013, 3 pages.
Office Action issued in Canadian Application No. 2,647,738 on Aug. 8, 2014, 4 pages.
European Examiner Ronald Haffner, Supplemental European Search Report. for Appl. No. EP07759972.8, dated Jul. 28, 2011, 8 pages.

* cited by examiner

| TITLE | REDIRECT | DISAMBIG | CATEGORIES |
|---|---|---|---|
| John Williams (composer) | John Towner Williams | John Williams | Star Wars music, ... Film score composers, 20th century classical composers |
| John Williams (wrestler) | Ian Rotten | John Williams | Professional wrestlers, People living in Baltimore |
| John Williams (VC) | none | John Williams | British Army soldiers, British Victoria Cross recipients |
| Boston Pops Orchestra | Boston Pops, The Boston Pops Orchestra | Pops | American orchestras, Massachusetts musicians |
| United States | US, USA, ... United States of America | US, USA, United States | North American countries, Republics, United States |
| Venus (planet) | Planet Venus | Venus, Morning Star, Evening Star | Venus Planets of the Solar System, Planets, Solar System, ... |

FIG. 2

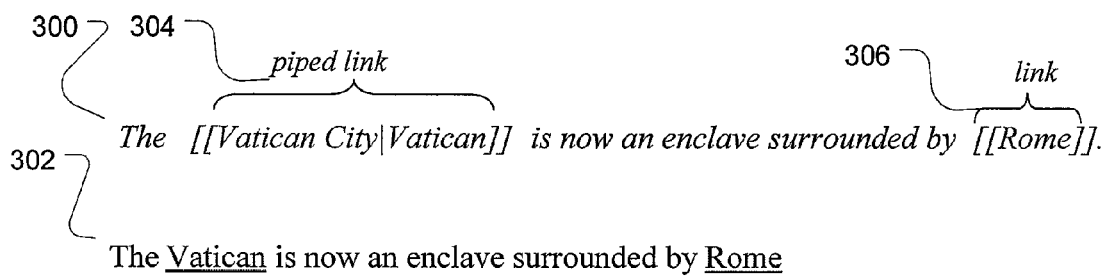

The [[Vatican City|Vatican]] is now an enclave surrounded by [[Rome]].

The Vatican is now an enclave surrounded by Rome

FIG. 3

| δ | Query Text (q.text) | Entity Title ($e_k$.title) |
|---|---|---|
| 1 | ...Boston Pops conductor John Williams led the symphony in the debut of TreeSong, Concerto for Violin and Orchestra... | $e_1$ : John Williams (composer) |
| 0 | ...Boston Pops conductor John Williams led the symphony in the debut of TreeSong, Concerto for Violin and Orchestra... | $e_2$ : John Williams (wrestler) |
| 0 | ...Boston Pops conductor John Williams led the symphony in the debut of TreeSong, Concerto for Violin and Orchestra... | $e_3$ : John Williams (VC) |

FIG. 4

DISAMBIGUATION OF NAMED ENTITIES

CROSS REFERENCE TO RELATED APPLICATION

This application claims the benefit under 35 U.S.C. §119 (e) of Application Ser. No. 60/744,091 filed on Mar. 31, 2006, which is incorporated by reference herein.

BACKGROUND

The present invention relates to information retrieval systems generally, and more particularly to disambiguation of named entities within documents and queries.

Searches for named entities are among the most common searches on the Web. These types of searches include searches for persons, places (including geographical locations as well as cities, states, countries, etc.), businesses and other organizations, products, books, movies, and so forth. Generally, a named entity is anything that has a proper noun (or noun phrase) or proper name associated with it. A search for a named entity typically returns a set of search results that have relevant information about any entity with the same name (or even a portion thereof) as the query. Thus, a query for "Long Beach" is likely to return documents about the coastal city in Long Island, N.Y. as well as documents about the coastal city in Southern California, as well as documents that are relevant to the terms "long" and "beach". Similarly, a query for "John Williams" will return documents about the composer as well as documents about the wrestler, and the venture capitalist, all of whom share this name; a query for "Python" will return documents pertaining to the programming language, as well as to the snake, and the movie. The underlying problem then is that queries for named entities are typically ambiguous, and may refer to different instances of the same class (e.g., different people with the same name), or to things in different classes (e.g., a type of snake, a programming language or a movie).

Search results for a named entity are typically ordered according to the frequency of the query terms, page rank, or other factors, without consideration of the different senses of the query (e.g., the different entities to which the name refers). The search results pertaining to the different entities tend to be mixed together. Further, even though the user is typically searching for a document (page) that best describes the named entity (or the different entities of the same name), the search results may not necessarily include or rank such a document very highly, again because the search system did not identify the different senses of the name.

SUMMARY

In one aspect of the invention, a knowledge base of named entity articles is used to disambiguate entity names during a search. The knowledge base is constructed from a database of documents (articles). The articles include articles about named entities, entities that have a proper name, such as "John Williams" (a person), "Long Beach" (a place), and "Python" (a movie, a programming language, and a deadly snake). The knowledge base includes certain features which afford the capability to disambiguate otherwise ambiguous entity names. The text of the articles provides a context that is associated with the particular sense of a name. The articles also contain links between instances of entity names and the article linked to the name. The articles also include redirect articles that associate an alternative or alias of a name to a particular named entity article. The articles also include disambiguation articles that disambiguate different senses of an ambiguous name. The relationships between contexts and the particular senses of a name are learned, in part using the linking information between each instance of an entity name and the associated article to which the name is linked. The learned relationships are maintained in a scoring model.

A search query including an entity name and additional keywords can then be disambiguated by identifying the entity name within a query, and using the scoring model to identify the article(s) most closely associated with the entity name. The disambiguated name and identified article(s) is then used to augment the search results, for example to group or organize relevant documents according to the identified entities.

In another aspect of the invention, articles in the knowledge base (and thus named entities as well) are associated with categories. The strength of the relationships between named entities and categories is learned and incorporated into the scoring model, and also used to disambiguate queries containing entity names.

In yet another aspect of the invention, the scoring model can be used to identify entities that are not included in the knowledge base.

The present invention has various embodiments, including as a computer implemented process, as computer apparatuses, as integrated circuits, and as computer program products that execute on general or special purpose processors.

BRIEF DESCRIPTIONS OF THE DRAWINGS

FIG. 2 illustrates a selection of entities and related information from a named entity dictionary.

FIG. 3 illustrates an example of links and piped links in the body of an article.

FIG. 4 illustrates a portion of a disambiguation dataset.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
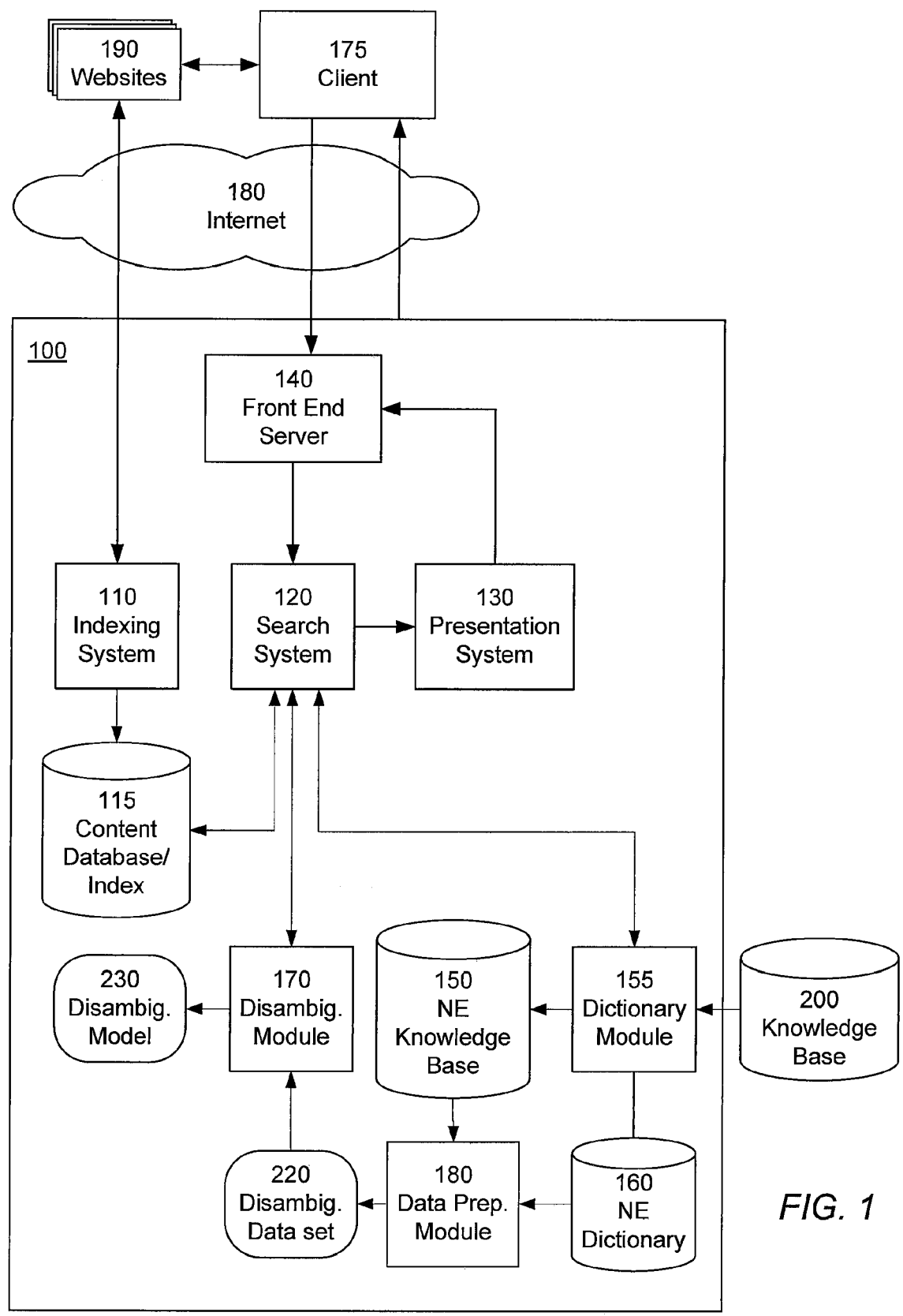
FIG. 1 illustrates a system architecture for one embodiment of the invention.

Referring now to FIG. 1, there is shown a system architecture of an information retrieval system in accordance with one embodiment of the present invention. In this embodiment, the system 100 includes an indexing system 110, a search system 120, a presentation system 130, a front end server 140, a named entity knowledge base 150, a dictionary module 155, a named entity dictionary 160, a disambiguation module 170, and a data preparation module 180. The system 100 interfaces with a knowledge base 200 of articles, including articles about named entities. The system 100 is coupled to a network, and over such network can be accessed by client devices of any type.

There are two basic operative phases of the system: generation of a collection of disambiguated named entities and a disambiguation ranking model 230 that represents the relationship between features and named entities, and second, the use of the disambiguation ranking model 230 during query processing to identify and disambiguate queries containing entity names.

The overall operation during the generation phase is as follows. The dictionary module 155 extracts a dictionary (a dataset) of named entities from the knowledge base 200 to form the named entity dictionary 160. The articles associated with the named entities included in the named entity dictionary 160 are extracted from the knowledge base 200 to form the named entity knowledge base 150. The data preparation module 180 uses the named entity dictionary 160 along with the hyperlink structure between articles in the named entity knowledge base 150, and the context (more generally features) of the named entity articles to create a disambiguation dataset 220. The disambiguation dataset 220 may also include category information identifying the categories associated with each named entity. The disambiguation module 170 uses the disambiguation dataset 220 to learn the strength of the relationships between words from the query context and categories from category taxonomy. The disambiguation ranking model 230 is used to disambiguate queries (of any type) that contain names, so as to assist in retrieving document relevant to the query.

The overall operation of the second phase is as follows. As a precursor to the handling of a query, the indexing system 110 is responsible for indexing documents in according to their contents (e.g., words, terms, media) by accessing various websites 190 and other document collections; the indexing system 110 creates an index and content database 115 for use in the retrieval. The front end server 140 receives queries from a user of a client 175, and provides those queries to the search system 120. The queries can be for any type of information, but of interest here are queries that include (or potentially include) the names of entities for which there exist named entity articles in the named entity knowledge base 150.

The search system 120 is responsible for searching for documents relevant to the search query (search results), including identifying any entity names in the search query, and retrieving documents relevant to the search query from the content database 115. The search system 120 also identifies entity names in the search results, and uses the disambiguation ranking model 230 to disambiguate the named entities in the search results, and uses the disambiguated names to augment the search results. Augmenting the search results, includes for example, organizing (grouping) the search results by the various senses of the disambiguated names, adding annotations, snippets or other content that further identify or describe the search results (individually or in groups) based on the disambiguated names, or a combination of the foregoing. For example, in response to a search for "John Williams", the search system 120 can group the search results into one set of documents pertaining to the composer John Williams, a second set of documents pertaining to the wrestler, a third set of documents pertaining to the venture capitalist, and on, for any number of the different senses of the name. The search system 120 can also selectively include (or exclude) documents, for example, including one document for each sense of an entity name (e.g., a document from the named entity knowledge base 150 about the entity) along with the remaining search results ranked by relevancy. Other forms of augmentation can be readily devised as well. The search system 120 provides the augmented search results to the presentation system 130; the presentation system 130 returns the results to the client 175. The details of various embodiments are now described in further detail.

The information retrieval system 100 makes use of a knowledge base 200, which may be part of, or independent of, the information retrieval system 100 (e.g., maintained by the same or a different operator or owner). The knowledge base 200 comprises a large (preferably) collection of articles (or more generally documents) about various topics, providing a type of online encyclopedia. An exemplary knowledge base 200 is the Wikipedia (available at www.wikipedia.com).

In the context of this invention, the term "article" shall be used, and is understood to include any type of media that can be indexed and retrieved by a search engine, including web documents, images, multimedia files, text documents, PDFs or other image formatted files, and so forth. The term "article" may also be used interchangeably with the term "document." A document may have one or more pages, partitions, segments or other components, as appropriate to its content and type. Equivalently a document may be referred to as a "page," as commonly used to refer to documents on the Internet. No limitation as to the scope of the invention is implied by the use of the generic terms "documents" or "articles." The system 100 operates over a large corpus of articles, such as the Internet and World Wide Web, but can likewise be used in more limited collections, such as for the document collections of a library or private enterprises. In either context, it will be appreciated that the articles are typically distributed across many different computer systems and sites. Without loss of generality then, the articles generally, regardless of format or location (e.g., which website or database) will be collectively referred to as a corpus or document collection. Each article has an associated identifier that uniquely identifies the article; the identifier is preferably a URL, but other types of identifiers (e.g., document numbers) may be used as well. In this disclosure, the use of URLs to identify articles is assumed.

The knowledge base 200 has the following structure. The knowledge base 200 comprises a hyperlinked collection of articles. Each article is identified by its title, typically a sequence of words, with the first word always capitalized. Typically, the title is the most common name for the entity described in the article. When the title (or "name") is ambiguous, it is further qualified with a parenthetical expression. For instance, the article on "John Williams" the composer has the title "John Williams (composer)." Of course, other ways of distinguishing otherwise ambiguous names may be used. Depending the schema and format of the knowledge base 200, particular formatting conventions may be used to format titles. For example, underscore "_" may be used instead of spaces in article titles.

Because each article describes a specific entity or concept, the term "entity" or "named entity" will be used as well to refer to the entity which is described by the article; the term "named entity article" will be used to refer to an article about a particular named entity. The term "entity name" will be used to refer to the proper name of a named entity, which can also be the title of the named entity article (or which title can be derived from the entity name, or vice versa). In the context of evaluation of a query, it is to be understood that identifying a named entity in a query (or article) is the process of determining whether the name of the named entity appears in the query (or article).

The following notation is now introduced:
E=the set of all named entities in the knowledge base 200.
e∈E=an arbitrary named entity.
e.title=the title of the article about e.
e.text=the text of the article about e (also can be denoted e.T, where T is the set of the texts of all articles associated with e).

In general, there is a many-to-many correspondence between names and entities. These relations are captured in the knowledge base 200 through two additional structures, redirect articles and disambiguation articles.

A redirect article exists for each alternative name that can be used to refer to an entity in the knowledge base 200. The alternative name is used as the title of the article, and the article contains a redirect link to the actual named entity article that is about the entity. An alternative name may also be understood as an alias of the entity's name. An alternative name can include a synonym, misspelling, or alternative spelling, acronym, common name, full name, slang name, translation, or any other way of designating the particular entity. For example, the name "John Towner Williams" is the full name for the composer John Williams, and thus serves as an alternative name for the composer. Accordingly, a redirect article with the title "John Towner Williams" is included in the knowledge base 200, and contains a redirect link (or other pointer) to the named entity article for "John Williams (composer)." Another example of an entity that can have many direct pages is the named entity "United States". Redirect pages may also be used for misspellings of titles (e.g., "Untied States"), acronyms (e.g., "USA", "U.S.", "U.S.A."), as well as translations (e.g. "Los Estados Unidos"), synonyms (e.g., "America"). The set of all alternative names that are associated with a given named entity e, and which redirect to that entity's named entity articles is notated as e.R.

For example, for the entity "United States", the following applies:
  e=United States
  e.title="United States"
  e.R={"USA", "U.S.A", "U.S." "US", "Estados Unidos", "America", "Untied States", . . . }

As discussed above, some entity names are ambiguous, in that they can refer to different instances of the same class of things, or even different classes of things. In the context of the knowledge base 200, an ambiguous name can refer to two or more different articles. Accordingly, the knowledge base 200 further includes, for each ambiguous name, an enumeration of the different senses that an ambiguous name can have. In one embodiment, the enumeration of the different senses of a name is held in a disambiguation page. Alternatively, this may be expressed as saying a disambiguation page lists all named entity articles that may be denoted by a particular ambiguous entity name. For each different sense of an ambiguous name, there is an associated description of the name with the sense. For example, for the named entity "John Williams", a disambiguation page can list a number of different entities which have the same name. As another example, consider the entity Venus, and the names "Morning Star" and "Evening Star". These names are each ambiguous, and yet both refer to the entity Venus; thus each of these names has an associated disambiguation page that includes "Venus" as a reference (and a link to the named entity article for "Venus").

Thus, for a given named entity, where will be a set of non-ambiguous names associated with the entity, as indicated by the titles of the redirect pages, as well as a set of additional ambiguous names that list that particular entity as one of the senses of an ambiguous name. For a given entity e, e.D is the set of names whose disambiguation pages contain a link to e (or alternatively, at least list e).

A further feature of the knowledge base 200 is the use of categories. Each article in the knowledge base 200 is associated with one or more categories. The categories are organized in topic-subtopic hierarchy (also called a category taxonomy), preferably in a directed acyclic graph. The association can made by associating categories tags (labels) to each article, or by maintaining a separate list of the articles included in each category, the list containing the names of the entities in the category, or the URLs (or other types of references, e.g., document IDs) to their respective articles. For example, the composer John Williams may be associated with the categories "Star Wars music," "$20^{th}$ century classical composers", "Film score composer", "Music" and so forth. Categories can also have the same name as named entities. Thus "Venus" can be both a category and a named entity for which there is a named entity article; the named entity article "Venus" can be associated with the more general categories of "Planets" and "Solar System." For a given named entity e, e.C is the set of categories to which e belongs. An entity is considered to belong to both its immediate categories, as well as all their ancestor categories in the category hierarchy. FIG. 2 illustrates an example of a number of named entities e (listed in the "Title" column), along with their associated redirect names (listed in the "Redirect" column), the titles of the disambiguation pages that list the entity (listed in the "Disambig" column), and their associated categories (listed in the "Categories" column).

Articles in the knowledge base 200 will often contain mentions (or "instances") of named entities for which there exist corresponding named entity articles. When a named entity of this sort is mentioned, the name of that named entity is linked via a hyperlink to the corresponding named entity article. Two types of links are preferably used: links and piped links. FIG. 3 illustrates an example of a code snippet 300 from an article in the knowledge base 200 and its corresponding display text 302. The string "Rome" in link 306 denotes the title of a named entity article, and thus this string also appears in the display text 302 as the anchor text of a hypertext link (shown underlined). In piped link 304 the title of the named entity article "Vatican City" is shown before the pipe symbol "|"; the string after the pipe, "Vatican", is the string that appears as the linked name in the display text 302. The use of piped links allows the authors of articles in the knowledge base 200 to refer and link to a given named entity article using a variety of different names. The links also provide disambiguation examples useful for training the disambiguation module.

The dictionary module 155 is one example of a means for generating a dictionary (a dataset) of named entities from the knowledge base 200 to form the named entity dictionary 160. The named entity dictionary 160 contains a plurality of names (which are themselves strings), where each name is mapped (associated with) some set of entities e from the knowledge base 200; the set of entities associated with a given name is denoted d.E. The dictionary module 155 determines the names d to be included from the knowledge base 200 based on the titles of articles, the names included on redirect pages, and the names included in disambiguation pages.

Figure 6:
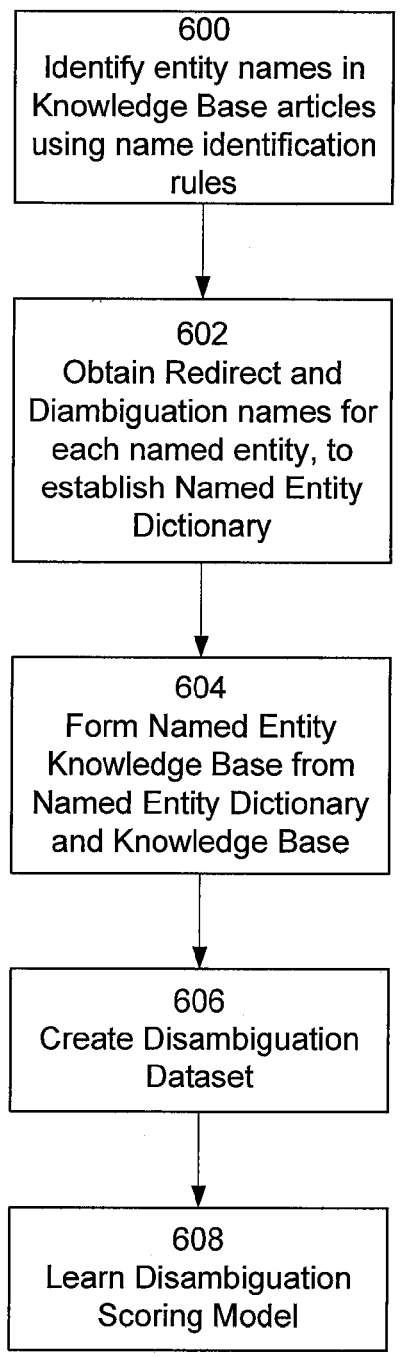
FIG. 6 illustrates a generalized method of generating a disambiguation scoring model.

In one embodiment, the dictionary module 155 generates the names d from the knowledge base 200 as follows. FIG. 6 illustrates this process. The dictionary module 155 processes 600 the title of each article in the knowledge base 200 using a set of name identification rules for detecting named entities. In one embodiment, the name identification rules are as follows:
  If e.title is a multiword title, then e is a named entity only if all content words are capitalized;
  If e.title is a one word title that contains at least two capital letters, then e is a named entity;
  If at least 75% of the occurrences of the title inside the article are capitalized, then e is a named entity.
The first rule identifies named entities such as "United States" or "Name of the Rose". Notice here that stop words (e.g., prepositions, articles, etc.) are not considered. The second rule identifies acronyms such as "NATO" or "LAGQ". The third rule identifies names of entities in other cases, where the title does not satisfy the first two rules, but usage of the title in the article indicates that the author considers the title to be proper noun phrase (hence its capitalization); a threshold amount other than 75% may be used of course. Other or additional rules can be employed to more liberally or conservatively identify named entities, and other rules may be used for other languages, which use different conventions (both grammatical and syntactical) to signal proper names.

Preferably, this process of identification happens automatically; the results need not be manually reviewed by an operator (especially in large knowledge bases where there may be upwards of 500,000 named entities). In addition, the dictionary module 155 can be invoked each time a new article is added to the knowledge base 200 to determine if it is about a named entity, as well as to identify additional mentions of named entities contained within the body of the article.

The dictionary module 155 uses 602 the redirect pages and disambiguation pages as follows to construct the named entity dictionary 160. For each name d, which was identified by the rules, the dictionary module 155 includes the following in the named entity dictionary 160:

the title of named entity article d.title,
the set of names, d.R that are redirect names of d, and
the set of names d.D that are the disambiguation names of d.

Thus, for a given name d, there is a set of entities d.E that d may denote in the knowledge base 200; a particular named entity e is included in this set d.E if and only if d=e.title, or d is a one of e's redirect names (d∈e.R), or d is one of the names that disambiguate e (d∈e.D).

From the named entity dictionary 160 and the knowledge base 200, the set of named entity articles, that is articles whose names are included in the named entity dictionary 160, the dictionary module 155 creates 604 (e.g., extracts, copies, indexes, or the like) the named entity knowledge base 165. This knowledge base 165 thus includes all named entity articles (including their hyperlinks), all redirect articles that redirect to any of the named entity articles, and all disambiguation articles that contain the names of (or links to) named entity articles. For each named entity, an association is made between the article, its redirect names, and its disambiguation name for the specific article for the correct sense of the name. Thus, one way to consider this stage is that the knowledge base 200 has been partitioned (or mirrored) into a sub-database (150) that contains only articles about named entities. This has been done programmatically by a heuristic based analysis of the titles of the articles, and the context of such titles.

In the next aspect of the generation phase, the data preparation module 180 creates 606 a disambiguation dataset 220, which is to be used as training data for the disambiguation module 170. The data preparation module 180 is one example of a means for generating a disambiguation dataset. One embodiment of the data preparation module 180 operates as follows.

As discussed above, for a given name ("John Williams"), there will be articles that include instances of this name in various contexts. Some of the articles may include the name "John Williams" when discussing the composer; other articles may include the same name when discussing the wrestler. In each case, as per the structure of the named entity knowledge base 150 (or alternatively, in the knowledge base 200 as well) discussed above with respect to FIG. 3, these instances are linked (via a link or a piped link) to the appropriate named entity article, that is the article that is about the entity being discussed. Further, the context in which the entity name appears (e.g., the sentence, paragraph, etc. containing the name) provides a source of data with the correct sense for the particular instance of the name. Accordingly, the data preparation module 180 makes use of these aspects of the named entity knowledge base 150 to construct the disambiguation dataset 200. This dataset has the following structure.

For the purposes of explanation, and without any loss of generality, the term "query" is used here to denote the occurrence of an entity name inside an article. If there is an entity name in the query q such that the set of denoted entities q.E contains at least two entities, one of them the correct entity q.e, that is linked to the occurrence of the name, then the query q is included in the dataset. More exactly, if q.E contains the names of n named entities $e_1, e_2, \ldots, e_n$, then the dataset 220 will be augmented with n pairs $\{q, e_k\}$ represented as follows:

$$\{q, e_k\} = [\delta(e_k, q.e) | q.\text{text} | e_k.\text{title}]$$

The held q.text contains words occurring in a limit length window centered on the proper name. In one embodiment, the window size is set to 55, which is one value that can provide optimum performance in the related task of cross-document co-reference, though certainly other values may be used. The Kronecker delta function $\delta(e_k, q.e)$ is 1 when $e_k$ is the same as the entity q.e referred to in the link. In other words, when there are multiple different entities with the same name (e.g., "John Williams"), then for a given article that includes a linked instance of this name, say an article describing classical music, the Kronecker delta function is set to 1 for the named entity article "John Williams (composer)" where the link that is associated with the name instance is actually linked to this named entity article. For all of the other named entity articles associated with the name "John Williams", the delta function is set to 0. Thus, out of all entities that may be denoted by the name instance, this flag indicates the correct entity. Thus, the disambiguation dataset 220 provides a set of data which disambiguates each instance of an entity name within the named entity knowledge base 150.

In one embodiment, the data preparation module 180 constructs the disambiguation dataset 220 using the following method. For each named entity article in the named entity knowledge base 150, the data preparation module 180 traverses the text of the article to identify hyperlinks therein. Processing the text here includes processing the source code, a document object model, an index, or other representation of the article. For example, hyperlinks can be identified in HTML by known tag, including <href> and others. Within each identified hyperlink there will be the name of an entity, serving as the anchor text of the link.

For each identified entity name, the data preparation module 180 determines the set of articles associated with this entity name, via a lookup in the named entity dictionary 160. One of these named entities will be the one that is the name of the article that is linked to by the hyperlink; the rest will be other articles (e.g., with non-matching titles). The article that is linked is a positive example of an instance of the entity name (e.g. "John Williams"), the context of the instance (e.g. "Boston Pops conductor John Williams led the symphony in the debut of TreeSong, Concerto for Violin and Orchestra.") and the named entity article itself ("John Williams (composer)"). For this tuple, the delta function flag is set to "1". For each remaining tuple—being a combination of the entity name, same context, and another one of the articles—the flag is set to "0".

FIG. 4 illustrates a small portion 400 of a disambiguation dataset 220, for the purpose of explanation only. Here, selected data 400 comprises three different tuples (rows) of data, resulting from three different combinations of the instance of the name "John Williams" with the three different articles matching that entity name (shown by the three different named entity article titles in the column 406). The query text (q.text) 404 containing the current instance is shown in the middle column. The instance of "John Williams" would be link, and the link would contain a reference to a named entity article, in the manner described above.

For the first tuple, the hyperlink includes the named entity article whose title "John Williams (composer)" matches the article referenced in the hyperlink. For this tuple, the delta function flag 402 is set to "1". The two other entries are for the other articles with the entity name "John Williams", e.g., the one for the named entity articles for "John Williams (wrestler)" and "John Williams (VC)". Because the titles of these articles do not match the title contained in the hyperlink, the flag 402 is set to "0". While this is a basic example of the content of disambiguation dataset 220, it is anticipated that additional contextual data, metadata, or other information may be included as well.

The disambiguation module 170 uses the disambiguation dataset 220 (or a portion thereof) to learn 608 a disambiguation scoring model 230. The disambiguation module 170 is one example of a means for learning the associations between the contextual information (e.g., the q.text or other features) and the entity names. The disambiguation module 170 constructs the disambiguation scoring model 230 in two phases.

First, some portion of disambiguation dataset 220 is selected as the training portion (another portion may be selected for model validation). For purposes of simplicity this portion will still be referred to as the disambiguation dataset 220.

For each tuple in the dataset 220, the disambiguation module 170 applies a scoring function to the combination of a query (e.g., an instance of an entity name in an article) and the named article itself, that is score (q, $e_k$). The scoring function is one that determines the relevance (or similarity) of the query to the article, thus providing a context-article similarity score. Any relevance or similarity scoring function can be used, and different disambiguation methods within the scope of the invention may use different scoring functions, since the particular function used is not critical.

One scoring function that may be used is based on the cosine similarity between the context of the query and the text of the article:

$$\text{score } (q, e_k) = \cos(q.\text{text}, e_k.\text{text}) = \frac{q.\text{text}}{\|q.\text{text}\|} \cdot \frac{e_k.\text{text}}{\|e_k.\text{text}\|}$$

In this embodiment, the components q.text and $e_k$.text are represented in the standard vector space model, where each component corresponds to a term in the vocabulary, and the term weight is the standard tfxidf score. The vocabulary V of terms (words or phrases) is taken from the corpus of articles in the knowledge base 200. For each word stem w, its document frequency df(w) is determined. Stop-words and words that are too frequent or too rare are discarded. A generic document (article) d is then represented as a vector of length |V|, with a position for each vocabulary word. If f(w) is the frequency of word w in document d, and N is the total number of articles in the knowledge base 200, then the weight of word w in the tfxidf representation of d is:

$$d_w = f(w) \ln \frac{N}{df(w)}$$

Using a scoring function such as the foregoing, the disambiguation module 170 can operate as follows. For a given query (entity name), the module determines from the named entity dictionary 160 the entities associated with the name. For each such entity, the disambiguation module 170 computes the scoring function between the named entity article, and the context for the query. This results, for example, in a cosine similarity score (or other relevance type score) between the named entity article and the query. The highest scoring named entity article is identified as the correct one for disambiguating the name, via the following primary ranking function:

$$\hat{e} = \arg\max_{e_k} \text{score } (q, e_k) \qquad (1)$$

if ê=q.e then ê is the named entity that provides the correct sense of q.

The disambiguation module 170 learns a generalization of (1), which will be further elaborated below. The learned ranking function is then used in the disambiguation scoring model 230.

Referring again to FIG. 1, one embodiment of query processing is now described in further detailed. During query processing for general searches, the search system 120 will receive a generic query from a client system 175. This query may include an entity name (or several entity names). Accordingly, the search system 120 passes the query to the dictionary module 155 to determine if the query contains an entity name, using the name identification rules. The rules can be applied to the entire query or to a portion thereof (e.g., using a sliding window over query terms). If an entity name is identified, the dictionary module 155 returns the list of named entities to the search system 120. The search system 120 passes the list of named entities to the disambiguation module 170, along with entire query. The disambiguation module 170 processes the query and the named entities, using a disambiguation scoring model 230. The disambiguation module 170 returns the results, which can include an identification of the correctly disambiguated entity, as well as the top N scoring entities, to the search system 120. The search system 120 uses the results to organize and rank the documents relevant to the search results, for example, grouping documents according to the ranking of the top scoring entities.

In another embodiment of the invention, the category information associated with each named entity article is further used to disambiguate named entities. This feature is beneficial when the words contained in an article do not describe the named entity with the same words used in queries about such entity. For example, the words "conduct" and "concert" may not for some reason appear in the article about John Williams the composer. If a query of "John Williams concert" is received, these terms would not be thus useful to identify this article in order to disambiguate the name "John Williams." Relevant words may not appear in an article, for example if the article is too short, incomplete, or simply uses synonymous terms.

More formally, the cosine similarity (or other relevance score) between q and $e_k$ can be seen as an expression of the total degree of correlation between words from the context of query q and the named entity article for a given named entity $e_k$. When the correlation is too low because the article for named entity $e_k$ does not contain all words that are relevant to $e_k$, it is worth considering the correlation between context words and the categories to which $e_k$ belongs.

Figure 5:
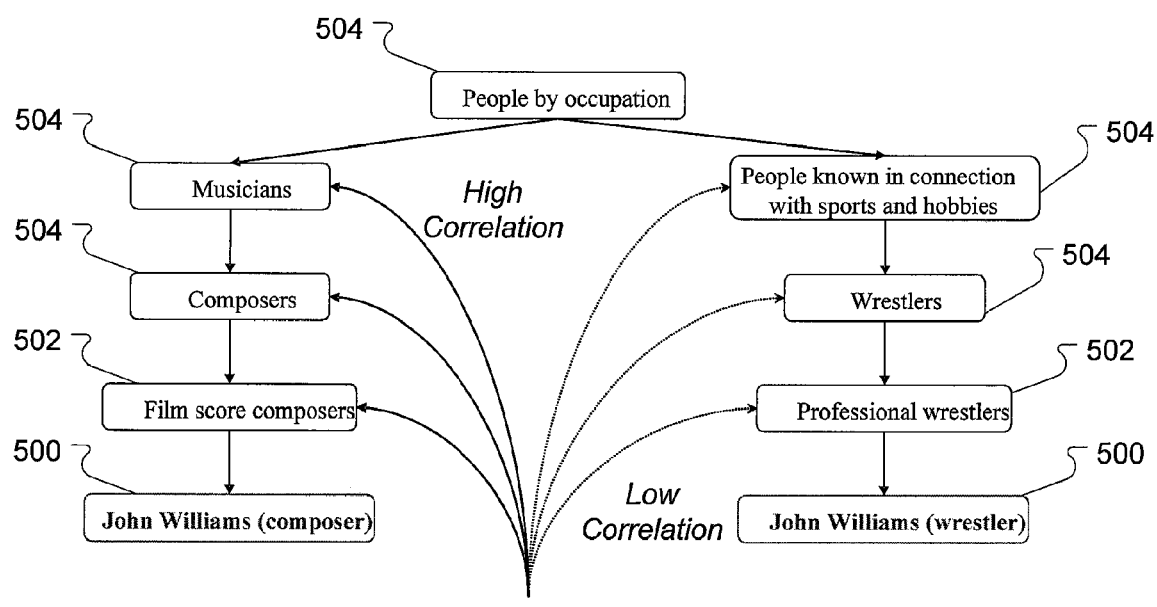
FIG. 5 illustrates an example of the correlations between a content terms and categories.

Referring to FIG. 5, there is shown an illustration of a potential query for the name "John Williams." To avoid clutter, FIG. 5 depicts only two entities 500 with the name "John Williams" in the named entity knowledge base 150, the composer and the wrestler. Over each entity, there is shown one of their associated categories 502 ("Film score composers" and "Professional wrestlers" respectively), together with some of their ancestor categories 504 (e.g., "Composers" and "Wrestlers") in the category hierarchy. An example query context 506 is also shown. Within the query, the term "concert" is highlighted. This term is highly correlated with the categories associated with "John Williams (composer)" as shown on the left, whereas the term has a low correlation with the categories associated with "John Williams (wrestler)", as shown on the right. The disambiguation module 170 further learns the correlations between terms and categories, which are then included in the scoring model 230.

The disambiguation module 170 uses the disambiguation dataset 220, which as described earlier includes a tuple for each combination of an entity name with a named entity article associated with such name, along with the context-article similarity score. The disambiguation module 170 further augments the disambiguation dataset 220 with an additional feature vector, which represents the similarity between the article text q.T and the article's categories.

The disambiguation module 170 then uses a generalized ranking function for the scoring module. The generalized ranking function is as follows:

$$\hat{e} = \arg\max_{e_k} w\Phi(q, e_k) \quad (2)$$

The feature vector $\Phi(q, e_k)$ contains a feature $\phi_{sim}$ for the context-article similarity score, and $|V| \times |C|$ features $\phi_{w,c}$ corresponding to the combinations of words w from the vocabulary V and categories c from the category hierarchy C:

$$\phi_{w,c}(q, e_k) = \begin{cases} 1 & \text{if } w \in q.T \text{ and } c \in e_k.C, \\ 0 & \text{otherwise.} \end{cases}$$

Thus, for each combination of a word w in V and a category c in C, the feature vector $\phi_{w,c}$ is set to 1 if the word w is included in the text of article q and c is one of the article's categories.

Accordingly, in one embodiment, the disambiguation module 170 performs the following processing of the category information. For each category c, the disambiguation module 170 determines the articles d which are associated with category c; as indicated above, each of these articles has a term vector therewith. The disambiguation module 170 determines a category vector $C_i$ that is the vector sum of these article vectors d. This is done first for categories which are the leaves of category hierarchy, and for at each of the ancestor categories. This process establishes a set of category vectors for all categories in the category taxonomy.

The weight vector W models the magnitude of each of the features of the feature vector $\Phi(q, e_k)$, including the weights of each word-category correlation. The weight vector is learned by training on the disambiguation dataset 220, described above, as augmented to include the word-category features. The learned weight vector is then used in the scoring model 230.

Referring again to FIG. 1, the search system 120 can provide a query, as before, to the disambiguation module 170, for disambiguation. The disambiguation module 170 uses the extended embodiment of the scoring model 230 including the word-category features, and returns a set of N top scoring entities, including category information for each such entity. The scoring system 120 uses the identified and disambiguated entities and category information to organize the search results and provides those to the presentation system 130.

As further feature of the system, the disambiguation module 170 may be configured to identify names of entities for which there is no corresponding named entity article in the named entity knowledge base 150. For example, there may several articles pertaining to "John Williams" as shown above, but none of them may be for the noted saxophonist of the same name. Thus, being able to identify instances of named entities for which there is no article with the proper sense of the name is beneficial. These "outsider" entities are represented by a single special entity $e_{out}$.

To perform this type of identification, the disambiguation module 170 obtains the scores for the named entity articles having the same names, as before, and then ranks them according to their scores. Before identifying the maximum scoring named entity article as the correct one, the disambiguation module 170 compare this score to a threshold. Only if this score is greater than the threshold, is the article identified as the correct one. If the maximum score is less then the threshold, then none of the entities are the correct one.

More formally, the detection of outsider entities can be included in the scoring model 230 in the follow manner. For the entity $e_{out}$, its features are set to null values, e.g., the article text $e_{out}.T=$"", and the set of categories $e_{out}.C=\{\}$. The basic ranking function (1) is then updated so that it returns the named entity with the highest score, if this score is greater then a threshold $\tau$, otherwise it returns $e_{out}$:

$$e_{max} = \arg\max_{e_k} \text{score } (q, e_k)$$

$$\hat{e} = \begin{cases} e_{max} & \text{if score } (q, e_{max}) > \tau, \\ e_{out} & \text{otherwise.} \end{cases}$$

Where the generalized ranking function (2) is implemented using the weighted combination of feature functions, then this modification results in an additional feature $\phi_{out}$ in the feature vector $\Phi(q, e_k)$, as follows, $\phi = [\phi_{sim} | \phi_{w,c} | \phi_{out}]$, where $$\phi_{out}(q, e_k) = \delta(e_k, e_{out})$$

In summary, the scoring model 230 can be variably designed to consider any combination of different feature groups when disambiguating entity names: a feature representing the similarity between an article and the context of a query, a feature representing the correlation between an article and the categories associated with the article, and a feature representing outside entities. Additional features can also be included in the scoring model 230 as deemed appropriate. For example, additional features can include link structure metrics (e.g., such as page-rank), topic-based metrics, phrase-based scores, popularity metrics of article popularity, reputation metrics (e.g., of the reputation of article authors), recency metrics (based on the age of the article) and so forth. Thus, the scoring model 230 herein should be understood to be flexible to accommodate additional features and implementations used to disambiguate named entities.

The learning algorithm used by disambiguation module 170 can be implemented as a support vector machine (SVM) or other supervised learning algorithms. As indicated above, a kernel function may be used here. One embodiment uses a kernel version of the large-margin ranking approach described in Joachims, "Optimizing search engines using click-through data," Proceedings of the Eighth ACM SIGKDD International Conference on Knowledge Discovery and Data Mining, pp. 133-142 (2002), which solves the optimization problem set forth below:

minimize:

$$V(w, \xi) = \frac{1}{2} w \cdot w + C \sum \xi_{q,k}$$

subject to:

$$w(\Phi(q,q.e) - \Phi(q,e_k)) \geq 1 - \xi_{q,k}$$

$$\xi_{q,k} \geq 0$$

$$\forall q, \forall e_k \in q.E - \{q.e\}$$

The aim of this formulation is to find a weight vector w such that 1) the number of ranking constraints $w\Phi(q, q.e) \geq w\Phi(q, e_k)$ from the disambiguation dataset 220 that are violated is minimized, and 2) the ranking function $w\Phi(q, e_k)$ generalizes well beyond the training data. In the above optimization problem, C is a parameter that allows trading-off margin size against training error. The number of linear ranking constraints is q (|q.E|−1). As an example, each of the three queries shown in FIG. 4 generates two constraints.

The learned w is a linear combination of the feature vectors $\Phi(q, e_k)$, which makes it possible to use kernels. It is straightforward to show that the dot product between two feature vectors $\Phi(q, e_k)$ and $\Phi(q', e'_k)$ is equal with the product between the number of common words in the contexts of the two queries and the number of categories common to the two named entities, plus the product of the two cosine similarities. The corresponding ranking kernel is:

$$K(\langle q, e_k \rangle, \langle q', e'_k \rangle) = |q.T \cap q'.T| \cdot |e_k.C \cap e'_k.C| + \cos(q.T, e_k.T) \cdot \cos(q'.T, e'_k.T)$$

To avoid numerical problems, the first term of the kernel is normalized and the second term is multiplied with a constant, e.g., $\alpha = 10^8$, as follows:

$$K(\langle q, e_k \rangle, \langle q', e'_k \rangle) = \alpha \cdot \cos(q.T, e_k.T) \cdot \cos(q'.T, e'_k.T) + \frac{|q.T \cap q'.T|}{\sqrt{|q.T| \cdot |q'.T|}} \cdot \frac{|e_k.C \cap e'_k.C|}{\sqrt{|e_k.C| \cdot |e'_k.C|}} + 1(e_k = e_{out}) \cdot 1(e'_k = e_{out})$$

In summary then, the present invention provides various methods and systems for defining various types of disambiguation scoring models using a knowledge base of articles with disambiguation features such as links, redirect (alias) and disambiguation articles, and performing disambiguation of queries during query processing.

The present invention has been described in particular detail with respect to various embodiments, and those of skill in the art will appreciate that the invention may be practiced in other embodiments. In addition, those of skill in the art will appreciate the following aspects of the disclosure. First, the particular naming of the components, capitalization of terms, the attributes, data structures, or any other programming or structural aspect is not mandatory or significant, and the mechanisms that implement the invention or its features may have different names, formats, or protocols. Second, the system may be implemented via a combination of hardware and software, as described, or entirely in hardware elements. Third, the particular division of functionality between the various system components described herein is merely exemplary, and not mandatory; functions performed by a single system component may instead be performed by multiple components, and functions performed by multiple components may instead performed by a single component.

Some portions of above description describe the invention in terms of algorithms and symbolic representations of operations on information. These algorithmic descriptions and representations are the means used by those skilled in the data processing arts to most effectively convey the substance of their work to others skilled in the art. These operations, while described functionally, computationally, or logically, or symbolically are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware or hardware.

In addition, the terms used to describe various quantities, data values, and computations are understood to be associated with the appropriate physical quantities and are merely convenient labels applied to these quantities. Unless specifically stated otherwise as apparent from the following discussion, it is appreciated that throughout the description, discussions utilizing terms such as "processing," "computing," "determining," "organizing," "grouping," and so forth, refer to the action and processes of a computer system, or similar electronic computing device, that manipulates and transforms data represented as physical (electronic) quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well-suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

We claim:

1. A method comprising:
   receiving, by a computer and from a client system, a query including a proper name, the proper name appearing in a context in the query, the context including terms of the proper name and additional terms that do not include the proper name;
   determining, by the computer, named entities corresponding to the proper name;
   for each corresponding named entity, identifying, by the computer, a named entity article about the named entity, wherein each named entity article about a named entity is different from the named entity articles about the other named entities;
   for each corresponding named entity, determining, by the computer, prior to disambiguation of the proper name included in the query, a similarity score between the named entity article about the named entity and the context in the query containing the proper name, wherein the similarity score is a measurement of correlation between the context in the query containing the proper name and the named entity article;
   disambiguating, by the computer and based on the similarity scores between the context in the query and the respective named entity articles, the proper name to a single instance of the proper name by associating it with the named entity article having a highest similarity score between the context in the query and the named entity article; and
   providing, by the computer, the named entity corresponding to the named entity article having the highest similarity score;
   wherein each named entity article is a web document about the named entity; and
   determining a similarity score includes determining a similarity score based, in part, on link structure metrics of the named entity article, popularity metrics of the named entity article, recency scores for the named entity article, and reputation based scores for the named entity article.

2. The method of claim 1, wherein the similarity score is based on a cosine similarity function between a vector representation of the context and a vector representation of the named entity article.

3. The method of claim 1, further comprising:
   for each named entity article, associating the article with a set of names of articles that redirect to the named entity article.

4. The method of claim 1, further comprising:
   for each named entity article, associating the article with a set of names of disambiguation articles that include a link to the named entity article.

5. The method of claim 1, further comprising:
   identifying the articles in a database that are named entity articles; and
   constructing a set of proper names from the identified named entity articles.

6. The method of claim 1, further comprising:
   constructing a set of proper names from titles of named entity articles, redirect articles, and disambiguation articles.

7. The method of claim 1, wherein the named entities are article titles, and wherein each named entity is identified from an article title of an article if one or more of the following conditions are met:
   the article title is a title in which all of the words are capitalized;
   the article title is a single word title in which at least two letters of the word are capital letters; and
   the article title is a title in which at least a majority of instances of the article title appearing in the text of the article are capitalized.

8. The method of claim 1, further comprising:
   determining for each named entity article categories assigned to the named entity article; and
   wherein determining the similarity score between the named entity article about the named entity and the context in the query containing the proper name comprises determining a correlation between context words in the query and the categories assigned to the named entity article.

9. The method of claim 1, further comprising:
   associating each combination of a proper name and a named entity article in which the proper name appears with a feature vector including an indication of categories assigned to the named entity article.

10. The method of claim 9, wherein disambiguating the proper name comprises:
    identifying for the proper name the named entity article having a feature vector that has a high correlation between words of the context and categories assigned to the named entity article.

11. The method of claim 9, wherein the feature vector further includes a feature associated with a named entity that does not have an associated named entity article in the database.

12. The method of claim 11, wherein the feature vector further includes a similarity score between a context of the proper name in the named entity article, and the text of the named entity article.

13. A system comprising:
    one or more computers; and
    a non-transitory computer-readable medium coupled to the one or more computers having instructions stored thereon which, when executed by the one or more computers, cause the one or more computers to perform operations comprising:
       receiving, from a client system, a query including a proper name, the proper name appearing in a context in the query, the context including terms of the proper name and additional terms that do not include the proper name;
       determining named entities corresponding to the proper name;

for each corresponding named entity, identifying a named entity article about the named entity, wherein each named entity article about a named entity is different from the named entity articles about the other named entities;

for each corresponding named entity, determining, prior to disambiguation of the proper name included in the query, a similarity score between the named entity article about the named entity, and the context in the query containing the proper name, wherein the similarity score is a measurement of correlation between the context in the query containing the proper name and the named entity article;

disambiguating, by the one or more computers and based on the similarity scores between the context in the query and the respective named entity articles, the proper name to a single instance of the proper name by associating it with the named entity article having a highest similarity score between the context in the query and the named entity article; and providing the named entity corresponding to the named entity article having the highest similarity score;

wherein each named entity article is a web document about the named entity; and determining a similarity score includes determining a similarity score based, in part, on link structure metrics of the named entity article, popularity metrics of the named entity article, recency scores for the named entity article, and reputation based scores for the named entity article.

14. A non-transitory computer storage medium encoded with a computer program, the program comprising instructions that when executed by data processing apparatus cause the data processing apparatus to perform operations comprising:

receiving, from a client system, a query including a proper name, the proper name appearing in a context in the query, the context including terms of the proper name and additional terms that do not include the proper name;

determining named entities corresponding to the proper name;

for each corresponding named entity, identifying a named entity article about the named entity, wherein each named entity article about a named entity is different from the named entity articles about the other named entities;

for each corresponding named entity, determining, prior to disambiguation of the proper name included in the query, a similarity score between the named entity article about the named entity, and the context in the query containing the proper name, wherein the similarity score is a measurement of correlation between the context in the query and the named entity article;

disambiguating, by the data processing apparatus and based on the similarity scores between the context in the query and the respective named entity articles, the proper name to a single instance of the proper name by associating it with the named entity article having a highest similarity score between the context in the query and the named entity article; and providing the named entity corresponding to the named entity article having the highest similarity score;

wherein each named entity article is a web document about the named entity; and determining a similarity score includes determining a similarity score based, in part, on link structure metrics of the named entity article, popularity metrics of the named entity article, recency scores for the named entity article, and reputation based scores for the named entity article.

\* \* \* \* \*